(12) United States Patent
Mendhi et al.

(10) Patent No.: US 11,276,059 B2
(45) Date of Patent: Mar. 15, 2022

(54) SYSTEM AND METHOD FOR AUTONOMOUS SUSTENANCE OF DIGITAL ASSETS

(71) Applicant: Molten Inc., Cambridge, MA (US)

(72) Inventors: Arjun Mendhi, Cambridge, MA (US); Ji Hyun Min, Cambridge, MA (US); Nchinda Nchinda, Cambridge, MA (US); William Spencer, Cambridge, MA (US)

(73) Assignee: Molten Inc., Cambridge, MA (US)

( * ) Notice: Subject to any disclaimer, the term of this patent is extended or adjusted under 35 U.S.C. 154(b) by 159 days.

(21) Appl. No.: 16/526,879

(22) Filed: Jul. 30, 2019

(65) Prior Publication Data

US 2020/0042998 A1    Feb. 6, 2020

Related U.S. Application Data

(60) Provisional application No. 62/794,207, filed on Jan. 18, 2019, provisional application No. 62/725,891, (Continued)

(51) Int. Cl.
*G06Q 20/38* (2012.01)
*H04L 9/32* (2006.01)
(Continued)

(52) U.S. Cl.
CPC ....... *G06Q 20/389* (2013.01); *G06Q 20/0658* (2013.01); *G06Q 20/1235* (2013.01);
(Continued)

(58) Field of Classification Search
None
See application file for complete search history.

(56) References Cited

U.S. PATENT DOCUMENTS 5,892,900 A * 4/1999 Ginter .................... G06Q 20/06
726/26
6,658,568 B1 * 12/2003 Ginter .................... G06F 21/10
348/E5.006
(Continued)

FOREIGN PATENT DOCUMENTS

WO   WO-2017187399 A1 * 11/2017 ......... G06F 9/30029

OTHER PUBLICATIONS

Krause,Solvej Karla; Natarajan,Harish; Gradstein,Helen Luskin. Dec. 19, 2017. Distributed Ledger Technology (DLT) and blockchain (English). FinTech note;No. 1 Washington, D.C. : World Bank Group, http://documents.worldbank.org/curated/en/177911513714062215/Distributed-Ledger-Technology-DLT-and-blockchain (Year: 2017).*

(Continued)

*Primary Examiner* — Jacob C. Coppola
*Assistant Examiner* — Eduardo Castilho
(74) *Attorney, Agent, or Firm* — Loyal Intellectual Property Law PLLC; Travis Banta

(57) ABSTRACT

A system and method for autonomous sustenance of digital assets, including but not limited to digital media, is described. The system may include one or more smart contracts which provide terms for executing a provision of a digital asset to a user on a permanent or duration limited basis. The method may include ensuring the terms of the smart contract are executed such that digital rights holders in the digital assets are paid for access to the digital asset.

20 Claims, 7 Drawing Sheets

Related U.S. Application Data filed on Aug. 31, 2018, provisional application No. 62/712,836, filed on Jul. 31, 2018.

(51) Int. Cl.
*G06Q 20/06* (2012.01)
*G06Q 20/12* (2012.01)

(52) U.S. Cl.
CPC ....... *H04L 9/3247* (2013.01); *G06Q 2220/00* (2013.01); *H04L 2209/38* (2013.01); *H04L 2209/56* (2013.01)

(56) References Cited

U.S. PATENT DOCUMENTS

| | | | | |
|---|---|---|---|---|
| 10,269,009 | B1* | 4/2019 | Winklevoss | G06Q 20/105 |
| 2015/0262137 | A1* | 9/2015 | Armstrong | G06Q 20/065 |
| | | | | 705/41 |
| 2016/0300234 | A1* | 10/2016 | Moss-Pultz | G06Q 20/065 |
| 2016/0321769 | A1* | 11/2016 | McCoy | G06Q 20/065 |
| 2017/0005804 | A1* | 1/2017 | Zinder | G06F 16/219 |
| 2017/0134161 | A1* | 5/2017 | Goeringer | H04L 9/3236 |
| 2017/0212781 | A1* | 7/2017 | Dillenberger | G06F 9/5038 |
| 2017/0352031 | A1* | 12/2017 | Collin | G06Q 20/38 |
| 2018/0025442 | A1* | 1/2018 | Isaacson | G06Q 20/40 |
| | | | | 705/26.62 |
| 2018/0096349 | A1* | 4/2018 | McDonald | G06Q 20/0658 |
| 2018/0205552 | A1* | 7/2018 | Struttmann | G06F 21/78 |
| 2018/0285996 | A1* | 10/2018 | Ma | G06Q 50/184 |
| 2018/0314809 | A1* | 11/2018 | Mintz | G06F 21/105 |
| 2019/0080392 | A1* | 3/2019 | Youb | G06Q 20/065 |

OTHER PUBLICATIONS

Anonymous IP.com No. IPCOM000206691D IP.com Electronic Publication Date: May 2, 2011 (Year: 2011).*

J. Kishigami, S. Fujimura, H. Watanabe, A. Nakadaira and A. Akutsu, "The Blockchain-Based Digital Content Distribution System," 2015 IEEE Fifth International Conference on Big Data and Cloud Computing, 2015, pp. 187-190, doi: 10.1109/BDCloud.2015.60. (Year: 2015).*

Y. Zhu, Y. Qin, Z. Zhou, X. Song, G. Liu and W. C. Chu, "Digital Asset Management with Distributed Permission over Blockchain and Attribute-Based Access Control," 2018 IEEE International Conference on Services Computing (SCC), 2018, pp. 193-200, doi: 10.1109/SCC.2018.00032. (Year: 2018).*

* cited by examiner

SYSTEM AND METHOD FOR AUTONOMOUS SUSTENANCE OF DIGITAL ASSETS

PRIORITY CLAIM

This application claims priority to U.S. Provisional Patent Application No. 62/712,836 filed on Jul. 31, 2018, U.S. Provisional Patent Application No. 62/725,891 filed on Aug. 31, 2018, and U.S. Provisional Patent Application No. 62/794,207 filed on Jan. 18, 2019. These applications are hereby incorporated by reference, in their respective entireties.

BACKGROUND

1. Technical Field

The present disclosure generally relates to managing rights and revenue of digital assets and more specifically to a managing rights and revenue of digital assets utilizing decentralized infrastructure and decentralized ledger technology.

2. Description of the Related Art

Digital assets, including but not limited to digital media (e.g., music, pictures, video, artistic content, etc.), have associated rights, including but not limited to intellectual property rights, which are owned or licensed by one or more entities, including but not limited to individuals, applications and organizations. Typically, such rights may determine the stakeholders and entities that are involved, with varying levels of access, control and other benefits, on the operations or exploitation of the digital asset. Often when other entities, including but not limited to individuals, applications and organizations, want to utilize, interact with, acquire rights or licenses for a digital asset, such entities may need to connect with the rights holders or their authorized representatives, negotiate license terms and sign legal agreements. This is a complex, time consuming, expensive and even infeasible process, at times. For example, in the case of digital media, as the media industry has grown globally the value chains and financial operations of the digital assets may become significantly more complex. This may make it difficult for other entities, including but not limited to individuals, applications and organizations, to be able to connect and negotiate with all the required stakeholders of every digital asset they aim to get a license for to interact with or utilize it. Further, this also reduces the revenue and utilization opportunities for the rights holders of digital asset. Additionally, when digital assets are monetized, it may be difficult to distribute revenue in an auditable manner, complying with complex licensing terms, across stakeholders worldwide in various currencies.

SUMMARY

Disclosed herein is a system which includes a first computing device. The first computing device includes one or more processors which receive access to a digital asset from a publisher of the digital asset and which provide access to digital asset to a user. The one or more processors may receive a request to access the digital asset and identify one or more terms for accessing the digital asset specified by the publisher of the digital asset. The system further includes a display device which receives user interface image data from the one or more processors. The user interface image data includes data representative of one or more terms for accessing the digital asset specified by the publisher of the digital asset. The one or more processors may further receive an indication that a user accepts the one or more terms for accessing the digital asset specified by the publisher of the digital asset and create a data packet that is cryptographically signed by the user. The one or more processors may add a transaction request that is cryptographically signed by the user. The one or more processors may record, in a decentralized transaction ledger that is implemented as either a blockchain transaction ledger or a directed acyclical graphic decentralized ledger, that the terms for accessing the digital asset have been met by the user. The one or more processors may also provide the digital asset to the user.

Further disclosed herein is a method. The method may include receiving by one or more processors, a request to access a digital asset. The method may further include identifying, by the one or more processors, one or more terms for accessing the digital asset specified by a publisher of the digital asset. The method may further include displaying, on a display device, the one or more terms for accessing the digital asset specified by the publisher of the digital asset. The method may further include receiving, by the one or more processors an indication that a user accepts the one or more terms for accessing the digital asset specified by the publisher of the digital asset. The method may further include creating, by the one or more processors, a data packet that is cryptographically signed by the user. The method may further include adding, by the one or more processors, a transaction request that is cryptographically signed by the user to the data packet that is cryptographically signed by the user. The method may further include recording, by the one or more processors, in a decentralized transaction ledger that is implemented as either a blockchain transaction ledger or a directed acyclical graph decentralized ledger, that the terms for accessing the digital asset have been met by the user. The method may further include providing, by the one or more processors, the digital asset to the user.

BRIEF DESCRIPTION OF THE DRAWINGS

The accompanying drawings illustrate one or more embodiments of a system and method of autonomous sustenance of digital assets.

DETAILED DESCRIPTION OF PREFERRED EMBODIMENTS

Figure 1:
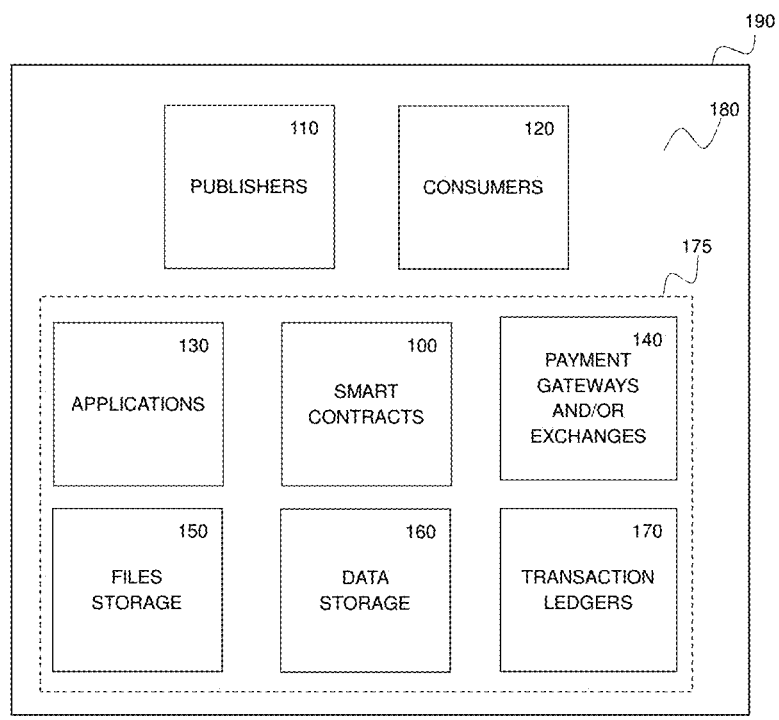
FIG. 1 illustrates a system which manages machine readable contracts to enable digital asset access to operate and sustain autonomously, according to some embodiments of the present disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Described embodiments relate to the operations of digital assets, including but not limited to digital media. The term "digital asset" is to be interpreted broadly as including not only music, video, picture, or other content, but may also include intellectual property rights in intellectual property (e.g., merchandizing rights for a popular cartoon character) or other intangible property rights and may also include sub elements or components of content, an example of which may be a drum track or a voice over track with or without music. Further, delivery of a digital asset to a user may include providing a user with a document that authorizes the user to use an intellectual property right held by the publisher of the digital asset. In one of more embodiments, autonomous digital assets are presented, which may perform various key functions, including but not limited to maintaining storage and access to their own data, earn resources by applying themselves, expend resources to perform tasks, and pay or provide resources to other entities.

In one of more embodiments, systems and methods that enable digital assets to support multiple currencies, including but not limited to fiat and cryptocurrencies is present. Digital asset rights holders may receive resources or money, in one or more currencies, and pay resources or money to other entities (for example, stakeholders of media content) in one or more currencies, in an auditable manner, which may be independent of geographical distances. In one or more embodiments, systems and methods are disclosed that enable digital assets to pay resources or money, in real-time (or immediately on receiving resources or money) per transaction, or in a batched manner, while maintaining auditability in both cases.

On decentralized ledgers, transactions may typically be implemented using digital currencies, sometimes referred to as "cryptocurrencies". While that typically may limit the use of decentralized ledger technology, in some embodiments, the present disclosure describes methods and systems that do not suffer from those limitations, allowing decentralized ledger based implementations to seamlessly provide support for multiple currencies, including but not limited to fiat currencies and cryptocurrencies. In some embodiments, this provides various benefits, including but not limited to the following examples. In some embodiments, it offers consumers (for example, any entity including but not limited to an automated process participating in a digital transaction) the ability to pay for an item or a service (for example, digital assets) in various currencies (including fiat currencies and/or cryptocurrencies), thereby helping expand the population of consumers the system may serve or attract. Additionally, in some embodiments, it reduces the impact of the volatility of exchange prices between different currencies. Furthermore, in some embodiments it offers parties such as sellers, providers, and publishers of digital assets, goods, or services the ability to receive money in a multitude of currencies which may or may not be the same currency in which consumers (e.g., users of the system) pay for the digital assets, goods, or services. In some embodiments, such flexibility is offered to users, consumers, sellers, publishers or any other participants of this system, with the benefits of quick and verifiable transactions on decentralized ledgers.

In some embodiments, methods and systems for supporting fiat currency transactions, for example in cryptocurrency or decentralized ledger-based systems, are disclosed. The systems and methods may be used with smart contracts that may run on one or more digital or decentralized ledgers (e.g. blockchains) and execute transactions in digital currencies or cryptocurrencies. In some transactions, consumers or users of digital assets do not use cryptocurrency. Furthermore, there may be high levels of volatility between cryptocurrencies and fiat currencies, and publishers or sellers of digital assets (individual and/or organizations) may not want to receive payments in such cryptocurrencies.

Entities who may access the disclosed system include, but are not limited to, human individuals, organizations, and computerized processes. Digital assets may further include, but are not limited to, any goods (physical or digital) or services that may be represented in a digital state, assigned with rights for utilization across a variety of cases, priced, sold, rented, traded, or paid for digitally. In an example, a digital asset may be digital media content such as a video, audio or image file. Consumers, also referred to as users, may include, but are not limited to, entities (e.g., humans, organizations or computerized processes) that interact with, utilize, benefit from, and/or pay for digital assets. In an example, consumers may be viewers, users or customers of a digital media (e.g. video) streaming service. Publishers may include, but are not limited to, entities (e.g., humans or computerized processes) that have the necessary rights to make digital assets available to consumers. In an example, publishers may include publishers (such as, but not limited to artists, studios, enterprises, applications, etc.) or those otherwise having rights in digital media content. Cryptocurrencies, may include, but are not limited to, currencies in which transactions may be implemented in decentralized ledgers. A decentralized ledger, which may also be referred to as a shared ledger or a distributed ledger technology ("DLT"), may include but is not limited to, a digital ledger technology typically run on distributed networks, with a mechanism for all participants in the network to agree on the outcome of each transaction, which may be referred to as a "consensus mechanism". Blockchain, Directed Acyclical Graph, or other technologies maybe used to create a DLT. A smart contract may refer to, but is not limited to, a computer protocol or program for digitally facilitating, verifying, or enforcing the negotiation or performance of one or more contracts, or one or more transactions. Smart contracts may enable the performance of credible transactions which may or may not include the involvement of third-party services. Native currencies, sometimes referred to as "NC", may include but are not limited to, currencies (such as cryptocurrencies) in which smart contracts may implement transactions on a decentralized ledger. These currencies may or may not be backed or collateralized by one or more fiat currencies or other monetary deposits. Tokens may include but are not limited to, cryptocurrencies other than the native currency supported on a decentralized ledger. Such tokens may also be referred to as "altcoins" or "cryptotokens". Exchanges may include but are not limited to, systems, platforms, services, or markets that make it possible to sell or otherwise transact in a digital asset or currency (including but not limited to cryptocurrency), to buy another at a price, for example one that is determined by the supply from sellers and demand from buyers.

FIG. 1 describes a system 190 that enables autonomous sustenance of digital assets, including but not limited to digital media, according to some embodiments. System 190 may be implemented as a one or more computing devices. For example, publishers 110 may implement a computing device which interfaces and acts within system 190. Similarly, consumers 120 may implement a computing device which interfaces and acts within system 190. Computing devices in system 190 may include desktop computers, laptop computers, tablets, game consoles, personal computers, notebook computers, smart phones, smart watches, personal entertainment devices, and any other electrical computing device with access to processing power sufficient to interact with system 190. System 190 may include software and hardware modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within system 190 may be used to execute various applications and methods disclosed herein.

Further, system 190 may be implemented as a server computing device and may be implemented as cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may interface with publisher computing device 110 and consumer computing device 120. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art.

Any of the computing devices within or connected to system 190 may connect to the Internet. Any suitable internet connection may be implemented including any wired, wireless, or cellular based connections. Examples of these various internet connections include implemented using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between any of the components of system 190 or between system 190 and other computing devices.

The various components of the system 190 include, interconnections of data and communication and instructions processors 180, which includes but is not limited to application programming interfaces (or API). Publishers, via publisher computing device, 110, provide digital assets to the system 190, and may also be shareholders in the earnings of the digital assets. Consumers, via consumer computing device 120, may utilize, benefit from, and/or pay for digital assets.

Each digital asset may be identified by a combination of one or more address or attributes of the asset in the various components of system 190. The system contains a smart contracts storage device 100, which contains a computer readable and executable set of instructions with commercial and/or operational logic of the digital asset, and represents the digital asset in interactions with various computer programs, consumers 120, applications 130, payment gateways and/or exchanges 140, files storage 150, data storage 160, and/or transaction ledgers 170. Various modules of the system 190, including smart contracts 100, applications 130, payment gateways and/or exchanges 140, files storage 150, data storage 160, and/or transaction ledgers 170 may be built in one or more decentralized networks of computing and/or storage nodes, represented by 175. An example of a decentralized network of computing nodes is the Ethereum network, and an example of a decentralized files storage network is Filecoin which operates on the Interplanetary File System (IPFS) protocol. Therefore, the system 190, may as an example contain file and data storage modules implemented in centralized servers and decentralized networks. All or some of the elements in system 190 may interact with the smart contracts 100 through pre-determined interfaces 180, which include but are not limited to application programming interfaces (or API). Based on the functional request from such elements as 120, 130 and/or 140, certain parts of the smart contract 100 may be executed in one or more decentralized networks of computing nodes 175. The smart contract 100 or the entities interacting with the smart contract may pay resources to the networks 175, for the operational costs of executing the smart contract 100 by invoking processing devices to execute the various contractual and transactional steps for completing a transaction. Such operational costs of the smart contract 100 may include, but are not limited to, costs associated with network utilization, data storage and/or executing computations for the contract. The smart contract 100 may require payment to such resources across the network of computation nodes 175 for resources it utilizes, including transaction ledgers 170, data storage 160, and/or file storage 150. This fee may be transacted in any monetary form acceptable to the smart contract, including but not limited to fiat currency, cryptocurrency, altcoins, or other means that represent a quantity of monetary value, directly or indirectly.

A processor in system 190 executing smart contract 100, has access to metadata of the digital asset in the data storage 160, about the digital asset accessible for operations, including but not limited to read, write, alter and delete. For example, this metadata could include information about stakeholders and publishers 110 of the digital asset, including but not limited to their credits, ownership, rights to alter information, and share of revenue for the corresponding digital asset. The smart contract 100, manages the distribution of revenue from the earnings of the digital asset to the stakeholders or publishers 110. Each publisher 110 may provide identifiers for one or more of its receivable and/or payable accounts, across the networks or systems in which it chooses to manage its money and/or monetary resources 140. For example, a publisher may manage its money or resources on one or more decentralized ledgers, then 110 may provide its address in the transaction ledger 170. In another example, a stakeholder may manage its money in a fiat currency bank account, then the stakeholder would provide its bank and account information in 140.

The processor executing the smart contract 100 also has access to files related to the digital asset accessible for operations, including but not limited to read, write, alter and delete, in a file storage infrastructure 150. The files storage 150 and data storage 160, may be implemented in any storage system, including but not limited to cloud storage, decentralized storage, local storage connected to a network, such that it accessible to applications 130 and/or the smart contracts 100 through a shared network. The smart contract 100 also has access to exchanges and/or payment gateways 140, to be able to receive, pay and exchange funds.

In some embodiments of the system, consumers, via consumer computing device 120, may interact with the applications 130 to access the digital asset and make payments for the access. The processor executing smart contracts 100 may manage the transactions, submitting such transactions to a transactions ledger 170 in a monetary entity recognized by it. In other embodiments of the system, the applications 130 and smart contracts may interact with the payments gateways and/or exchanges 140 to receive, exchange or remit money in a variety of currencies, and appropriate exchanges to widen the range of acceptable currencies. In other embodiments of the system, when smart contracts 100 and transactions ledgers are implemented on decentralized networks 175, the system may operate without a centralized controlling authority. For even further decentralized and autonomous operations the other modules 130, 140, 150, and 160 may be implemented in decentralized networks as well and the successful operation of the system would not necessitate any central administrator or centralized data storage. It may operate in peer-to-peer (or decentralized) networks. A distributed transactions ledger device 170 may include consensus algorithms to ensure accurate replication across nodes is undertaken. One form of distributed transactions ledger design is the blockchain system, which may be either publicly or privately accessible. A blockchain is a growing list of data or records, called blocks, which are linked using cryptography. Each block may be linked to the previous block by storing the cryptographic hash or pointer to the previous block. Hence, a distributed transactions ledger may be implemented using a public or private blockchain, that may record transactions between two parties efficiently and in a verifiable and permanent way. In one embodiment, recording that one or more terms in a smart contract have been met by a user may be indicated by recording a transaction in a blockchain transaction ledger. Other technologies and data structures may also be used to create distributed transactions ledgers 170, including but not limited to directed acyclic graph.

Figure 2:
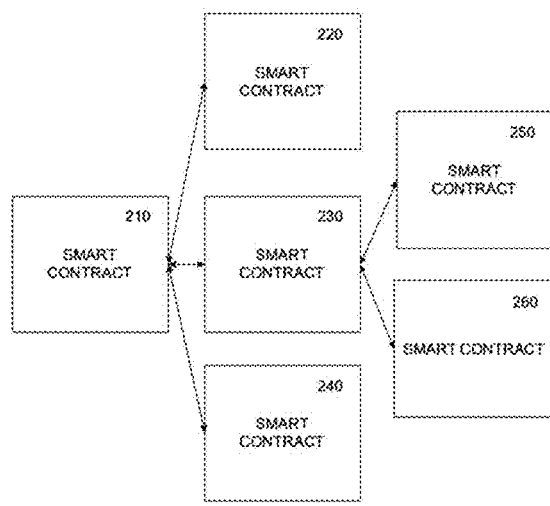
FIG. 2 illustrates a system for implementing nested contracts, according to some embodiments of the present disclosure.

FIG. 2 illustrates the nested structure of smart contracts, according to some embodiments, using, for example, system 190, shown in FIG. 1 and described above. The smart contracts module 100 in a decentralized network 175 shown in FIG. 1 may contain various interconnected smart contracts, the terms of which may be executed by a processor within system 190. FIG. 2, illustrates an example in which a smart contract 210, may invoke terms within smart contracts 220, 230, and/or 240, depending on the use-case of operation at any given execution of 210. In this exemplary scenario, we may consider 210 to be the calling-contract, and 220, 230, or 240 be the called-contract. Similarly, the called-contracts, may in turn call other contracts, for example, smart contract 230 may invoke terms within smart contracts 250 or 260, and so on. Such calling and information connections between smart contracts may or may not be bidirectional.

Figure 3:
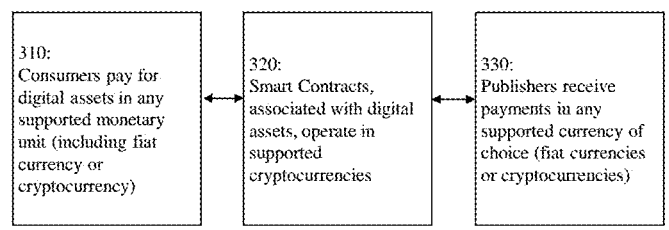
FIG. 3 illustrates an example implementation of a method to enable autonomous sustenance of digital asset according to a computer readable contract, according to some embodiments of the present disclosure.

FIG. 3 illustrates a flow diagram of a transaction executed by a processor in system 190 shown in FIG. 1, and demonstrates how in some embodiments this system offers flexibility to consumers of digital assets and to the publishers of the digital assets. In step 310 a consumer may pay for one or more digital assets in any currency supported by the system, such as a fiat currency or a cryptocurrency. Each decentralized transaction ledger on which various smart contracts execute transactions, supports one or more currencies (including but not limited to cryptocurrencies), which are referred as native currencies or NC of the decentralized transaction ledger or of the smart contract. In step 320, one or more smart contracts associated with the one or more digital assets may operate in one or more its supported native currencies. In step 330, the publisher may receive payment (s) in one or more supported currencies they have chosen, such as a fiat currencies or a cryptocurrencies. Thus, one or more of the consumer, the system, and the publisher may operate using a different desired currency while nonetheless supporting a fast, auditable and easy transaction.

Figure 4:
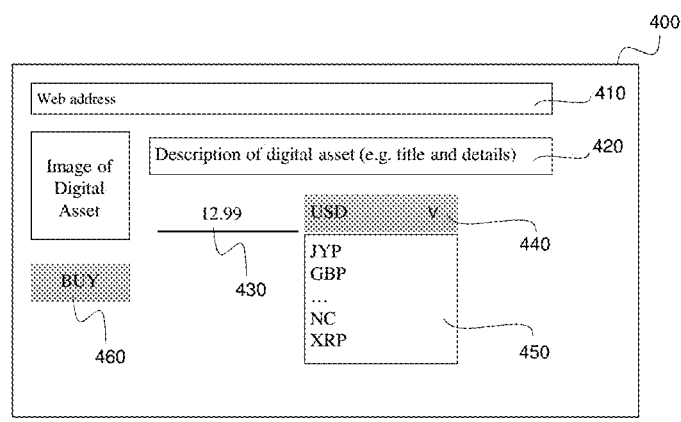
FIG. 4 illustrates a user interface for purchasing access to a digital asset from a publisher of the digital assets.

FIG. 4 shows an illustrative example a user interface 400 for purchasing access to a digital asset, at a web address 410 accessible through a web browser. User interface 400 may be accessible through, for example, consumer computing device 120, shown in FIG. 1. For example, graphical user interface 400 may be provided on a display controlled by a processor in system 190, shown in FIG. 1. User interface 400 includes a description 420 of the digital asset. The digital asset in this illustration may include but is not limited to a song, movie, eBook, picture, etc. Graphical user interface 400 illustrates an exemplary use-case of interacting with the digital asset, which includes but is not limited to one or more controls on the web user interface, such as the buy button 460 which may initiate a request to access a particular digital asset by obtaining a copy of the digital asset on a permanent or limited duration business (e.g., purchase or rental). Buy button 460, when selected by a user may cause the processor in system 190 to receive an indication that the user accepts one or more terms for accessing a digital asset. Terms for accessing a digital asset may be displayed in graphical user interface 400, such as a price, a currency in which purchase or rental fees may be paid, or other terms associated with acquiring a copy of the digital asset. The price for the transaction is listed in the price indicator 430, in a monetary unit selected in currency indicator 440, which in the illustration is USD. The consumer or the application may select from other supported monetary units listed in the selector 450, which includes but is not limited to various fiat currencies and cryptocurrencies.

In some embodiments, electronic, computer and/or web-based user interfaces may be provided both for consumers and publishers to interact with system 190 through a web browser interface. Both consumers and publishers may indicate one or more currencies of choice that may be different from the native currency of the decentralized ledger. When consumers view digital assets using the interface, they may see the price of the asset using one or more of the consumer's currency of choice, various other supported currencies, and the native currency of the decentralized ledger, as illustrated in an example in FIG. 4. Similarly, when publishers view their balance and/or access a user interface displaying earnings, they may view and/or receive their balance in one or more of the publisher's currency of choice and the native currency of the decentralized ledger.

Figure 5:
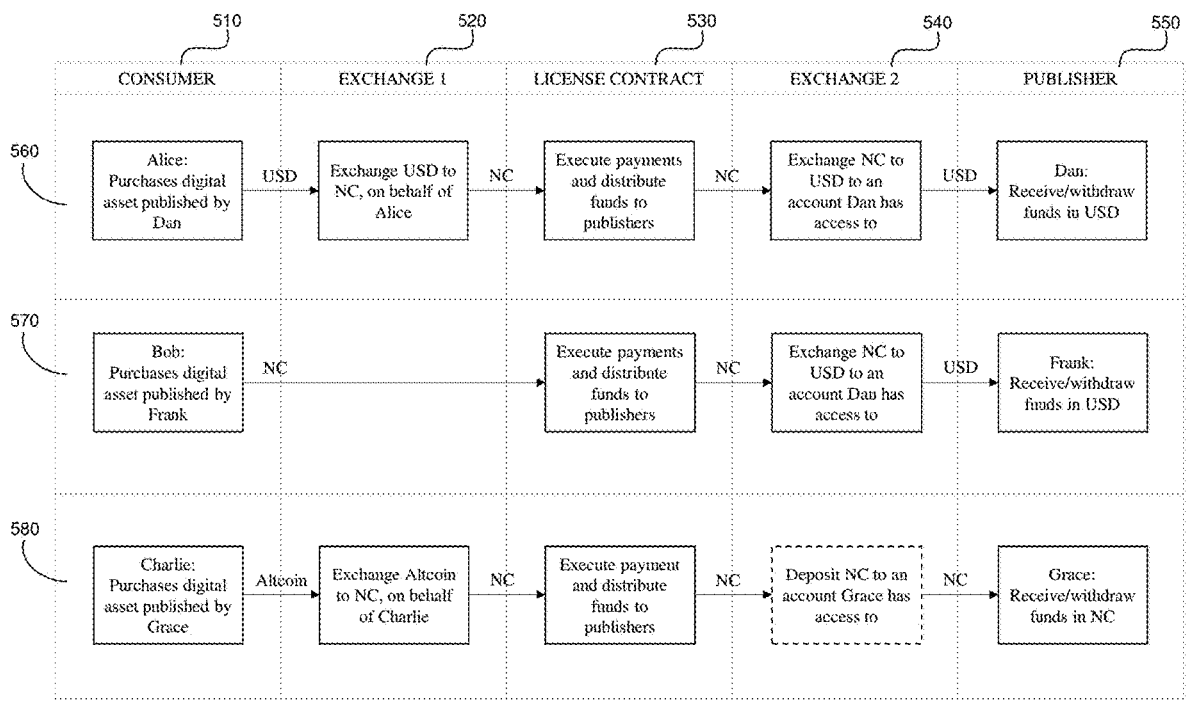
FIG. 5 illustrates an example of how consumers of one or more digital assets interact with the digital assets from a web-based interface, according to some embodiments.

In some embodiments, the consumer computing devices 120, publisher computing devices 110 and system 190 may utilize one or more currencies to make transactions on decentralized ledgers. As an illustrative example, FIG. 5 shows operational use-cases of the system, utilizing native currency, which in this example is called NC. NC may or may not be backed or collateralized by any fiat currency deposits. Similarly, the system may operate with one or more native currencies supported by the smart contracts. This native currency is used to perform transactions in the decentralized transaction ledger, regardless of the currency paid by the consumer or the currency received by the publisher.

For example, if the blockchain system and decentralized transaction ledger being used were the Ethereum network, the cryptocurrency Ether, which is not collateralized against any fiat currency deposits, and the cryptocurrency USDC which is collateralized with USD deposits to stabilize its exchange rate against the USD, would be compatible with the License Contract 540. Therefore, License Contract 540 would be able to execute transactions in either or both native currencies, Ether and USDC on the Ethereum blockchain.

FIG. 5, illustrates a few exemplary use-cases of the system. For example, in FIG. 5, three independent consumers, collectively represented by 510, Alice, Bob and Charlie (each of whom may represent one or more consumers), may utilize the system to purchase and pay for digital assets in three different types of currencies. In case 560 Alice chooses to pay for a digital asset in a fiat currency (USD), in case 570 Bob chooses to pay in cryptocurrency (NC) which in this example is the native currency of the system, and in case 580 Charlie chooses to pay in a altcoin, which serves as an exemplary cryptocurrency but is not a native currency of the decentralized ledger. In case 560, the publisher chooses to receive earnings in fiat currency (USD), in case 570 the publisher Frank also choose to receive earnings in fiat currency (USD), and in case 580 the publisher Grace chooses to receive earnings in cryptocurrency (NC).

Figure 6:
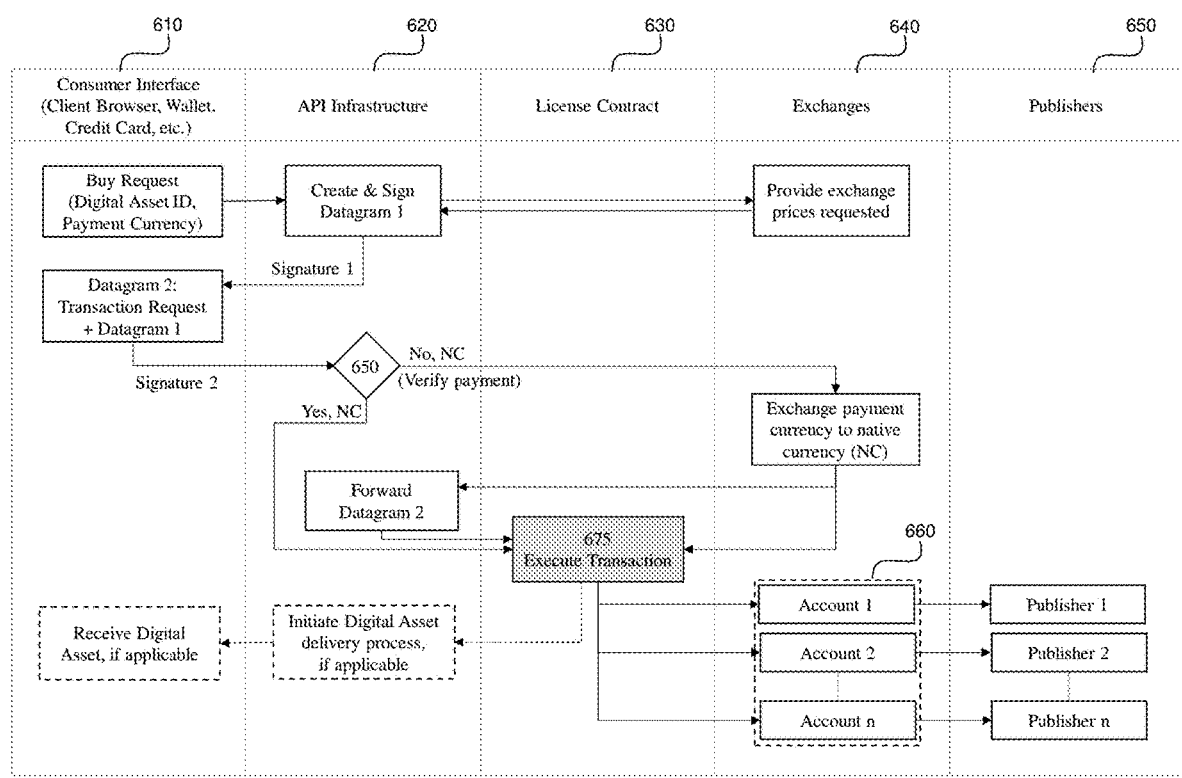
FIG. 6 illustrates an example of an operational use-case of the system.

System 190 may use a processor to send transactions in 560 and 580 from consumers Alice and Charlie respectively, who did not pay in the native currency, to one or more exchanges, collectively represented as EXCHANGE 1, 520, where the consumers' currency is exchanged for a native currency (details on how the system sends transactions are illustrated in FIG. 6). In FIG. 5, Alice's USD and Charlie's altcoin are exchanged for NC, the native currency of the system. The transaction is received by the smart contract, referred to as the license contract, 530, which includes but is not limited to, a collection of one or more smart contracts that may or may not interact with each other, with the ability to execute code and/or transactions on a decentralized transaction ledger. The license contract, 530 executes the payment for the digital assets for all transactions. The license contract, which may include one or more smart contracts that may or may not be independent, executes computer programs or code in one or more computing infrastructure, which may include but is not limited to, computing on a decentralized network of computers that host one or more decentralized ledgers. Such computation or execution of code may or may not involve a fee for computation resources, which may optionally be paid as part of a transaction that the license contract, 530 executes. For example, in the decentralized ledger and supporting decentralized network of computers for a blockchain system called Ethereum, the license contract, 530, would have the option of executing code on the nodes of the network and paying the computation fee in a unit called "gas" which is directly proportional to the amount of processing or the number and complexity of computation steps involved.

The publishers of the digital assets may be the beneficiaries of such payments. Other service providers (including but not limited to EXCHANGE 1, 520, EXCHANGE 2, 540, and LICENSE CONTRACT, 530) may or may not also receive a share of the revenue for their services. In FIG. 5, three independent publishers are shown, Dan, Frank and Grace, each of whom may represent one or more publishers. Each publisher may choose to receive its funds or share of revenue from the purchase of its published digital asset, in any currency (including but not limited to fiat currencies and cryptocurrencies) supported by EXCHANGE 2, 540. EXCHANGE 1, 520 and EXCHANGE 2, 540 may support the same or different currencies, depending on the design of the system.

In the example illustrated in FIG. 5, in case 560, Alice purchases a digital asset published by Dan, choosing to pay for it in fiat currency (e.g. USD), with Dan choosing to receive the funds in fiat currency as well (e.g. USD). When Alice purchases the digital asset, she is routed to EXCHANGE 1, 520, in which USD are exchanged for the native currency and the license contract, 530 is then executed using the native currency. When Dan chooses to receive funds, in EXCHANGE 2, 540 the native currency is exchanged for USD, which is then received by Dan. In another exemplary case 570 illustrated, Bob purchases a digital asset published by Frank, choosing to pay for it in cryptocurrency, which also is the native currency of the decentralized ledger (e.g. NC), with Frank choosing to receive the funds in fiat currency (e.g. USD). In this case, EXCHANGE 1, 520 is not necessary, but EXCHANGE 2, 540 must still exchange the native currency for USD before Frank receives payment. In yet another exemplary case illustrated, Charlie purchases a digital asset published by Grace, choosing to pay for it in an altcoin (which is not the native currency of the decentralized ledger), with Grace choosing to receive the funds in the native currency of the decentralized ledger (e.g. NC). When Charlie purchases the digital asset, he is routed to EXCHANGE 1, 520, in which the Altcoin is exchanged for the native currency and the license contract, 530 is then executed using the native currency. In this case 580, the publisher Grace chooses to receive earnings, if any, from Charlie's purchase of the digital asset, in the NC itself. Therefore, EXCHANGE 2 may or may not be required since there is no currency exchange.

In one embodiment, these processes across 520, 530 and/or 540 may occur automatically without input from the consumers and publishers. In another, users are directed to exchanges where they exchange currencies for native currency, or vice versa. In some embodiments, the exchanges utilized in the system, such as EXCHANGE 1, 520 and EXCHANGE 2, 540, may or may not be the same exchange, and each may represent a group of multiple exchanges. In such an embodiment, EXCHANGE 1, 520 receives funds from consumers and exchanges it for native currency of decentralized ledger. EXCHANGE 2, 540 receives funds from the LICENSE CONTRACT, 530 in the native currency of decentralized ledger and exchanges it for the desired currency by the beneficiary publisher. In some embodiments, EXCHANGE 1, 520 and EXCHANGE 2, 540 are the same exchange.

In some embodiments of the system, if a publisher chooses to receive funds in a currency that is anything other than the native currency of decentralized ledger, and also wants to reduce the impact of the volatility of the native currency of decentralized ledger, the system may exchange the beneficiaries funds in the native currency of decentralized ledger (e.g. NC) to a stable currency (such as, but not limited to, a currency chosen by the publisher or a fiat currency) automatically upon execution of the transaction by the LICENSE CONTRACT, 530. This is done by EXCHANGE 2, 540. The stable currency may be any currency (including but not limited to fiat currency or cryptocurrency) that is considered by the system or by the beneficiary as a currency stable enough to hold funds in, and for which exchange is supported by EXCHANGE 2, 540. For example, a stable fiat currency may be US dollar (USD), and a stable cryptocurrency may be a "stablecoin". In some embodiments, stablecoin may refer to a cryptocurrency that is designed to minimize its price volatility against a chosen price index, by pegging its price to that of a fiat currency, or an exchange-traded commodity or any other price index. Pegging the price may be achieved through various means of creating a fixed exchange rate, sometimes called a pegged exchange rate, which is a type of exchange rate regime in which a currency's value is fixed against either the value of another single currency, to a basket of other currencies, or to another measure of value, such as gold. A few nonlimiting examples of stablecoins are USDC, Tether, True USD, Dai, Digix, EURS, StableUSD, Basecoin, NuBits, etc. In an exemplary case, when EXCHANGE 2, 540 exchanges received native currency funds in NC for stablecoins that are pegged against USD, the volatility of the funds earned by the beneficiary publisher is hence eliminated against USD, and the beneficiary publisher may withdraw the funds from EXCHANGE 2, 540 in USD at any time. This may be achieved by exchanging stablecoin to USD at or before the time of withdrawal. In some embodiments, the native currency is selected as a stablecoin so as to further reduce volatility.

In some embodiments, the system or method may allow digital assets, such as media content, to be licensed on many decentralized networks and may accept payment from consumers in any currency that may be exchanged for the native currency of their respective systems, for example with the assistance of an exchange service.

Figure 7:
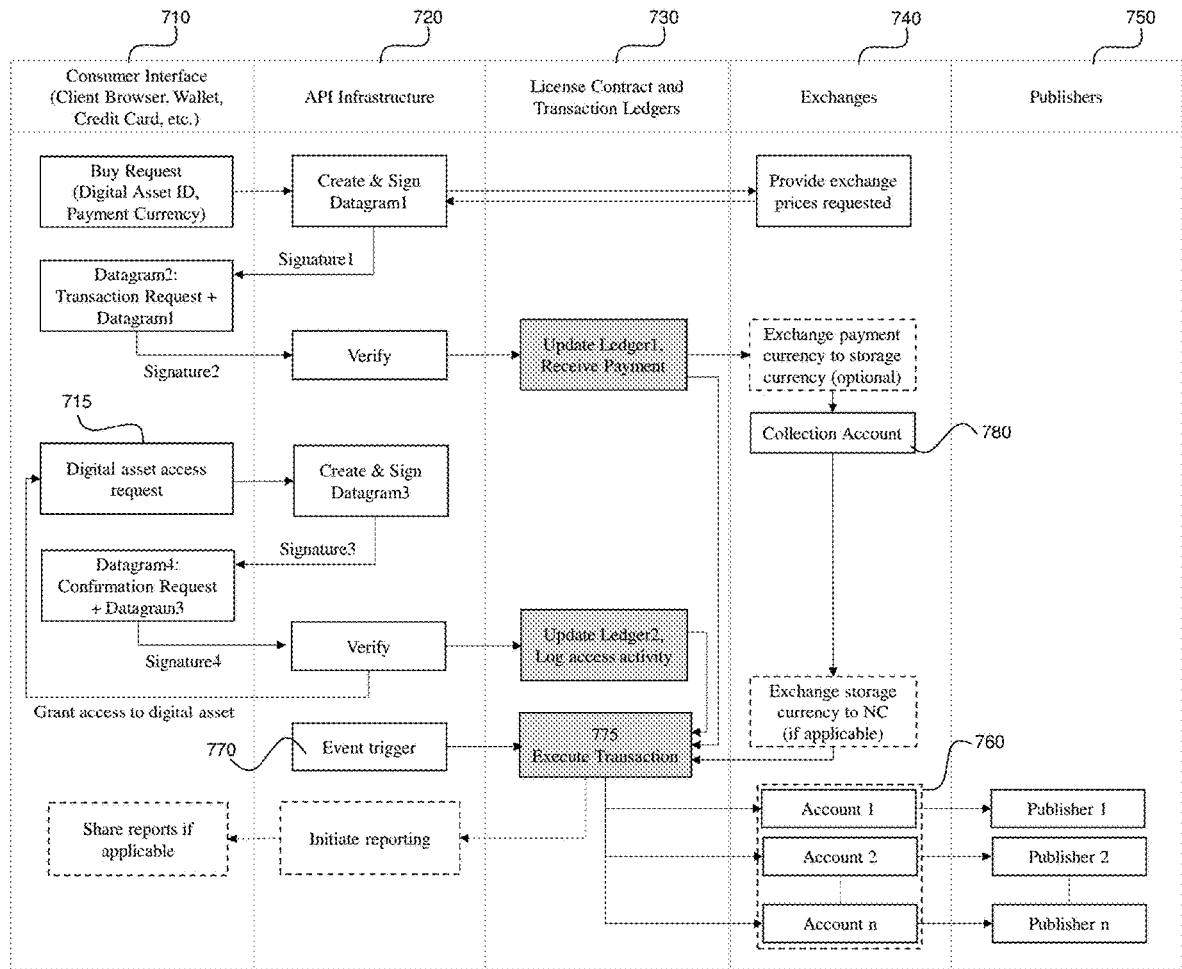
FIG. 7 illustrates a flowchart illustrating an exemplary implementation of the system, according to some embodiments.

In some embodiments, the entire process of receiving funds, exchanging them to native currency via EXCHANGE 1, 520, processing the transaction, crediting funds to all beneficiaries in the native currency, exchanging the native currency to a stablecoin and/or one or more desired currencies by the beneficiary publisher, may be managed and operated by the license contract. The license contract, 530 includes computer programs or code to perform such operations. Additional details on how it performs such options and interacts with the system, are illustrated in FIG. 6 and FIG. 7.

In some embodiments, to increase the speed of transactions at exchanges, some exchanges may achieve via a working capital or pool of funds maintained by the system. This working capital or pool of funds may be in the native currency. Accordingly, when a customer initiates a transaction, and license contract receives a confirmation to process the transaction, the system may begin to transfer the value of the transaction in the native currency to the publisher, and/or exchange funds from the working capital or pool of funds in the native currency via EXCHANGE 2, 540. At a later time, native currency may be received from EXCHANGE 1, 520 to replace the native currency taken from the working capital or pool of funds. In this way, even if there is an unacceptable time delay in receiving the paid amount by the consumer, and/or getting NC from EXCHANGE 1, 520, the system may ensure that the publisher receives payment quickly soon that there is verification that the consumer's payment is successful.

FIG. 6 is a flowchart illustrating an exemplary implementation of the system, which is one of the various ways in which this system may be implemented, according to some embodiments. It should be noted that the following interactions or operations may be autonomously executed. This exemplary implementation incorporates a number of smart contracts, discussed above, to implement the specific transaction processes described below with respect to FIG. 6. This figure describes a system in which a consumer may make a transaction for a digital asset that is settled immediately. The implementation of this system includes but are not limited to transactional applications for digital assets, for example, applications to buy or rent movies. This exemplary system includes one or more of the following:

Consumer Interface, 610 which in FIG. 6 may collectively represent any consumer-facing technology that the consumer utilizes to interact with the other key entities in the system. The consumer interface 610 may include, but is not limited to web browsers, consumer's credit cards, cryptocurrency wallet applications to manage digital currency and/or web-based payment systems (such as PayPal™), API Infrastructure, 620, which passes information and commands between the various modules of the system. The API Infrastructure, 620 may collectively represent the messaging, communication, and computation infrastructure that is not part of the license contract, exchange services or consumer interface, License Contract(s), 630, which may interact with the decentralized ledger to execute code and/or make transactions, which may be accomplished in one or more native currencies (NC), as the license contract, 630 may contain an infrastructure of smart contracts and it creates and transmits transactions through the decentralized ledger network, Exchange(s), 640 may collectively represent all exchange services utilized by the system, including but not limited to, exchanges of fiat currencies and/or cryptocurrencies. It may also collectively represent EXCHANGE 1, 520 and EXCHANGE 2, 540 with reference to FIG. 5.

Publisher(s), 650, may include the suppliers and/or beneficiaries of transactions made on digital assets.

In some embodiments, during operation of the system of FIG. 6 the consumer may initiate a transaction on a digital asset. As a non-limiting example, the consumer may initiate a buy request on a digital asset. The buy request may include, but is not limited to, a digital asset ID (e.g., an identifier to uniquely identify the digital asset the consumer wants to pay for), and payment currency (which may refer to the currency the consumer wants to pay in, which may include but is not limited to fiat currencies and cryptocurrencies). The consumer may send the Buy Request to the API infrastructure 620 using any available Consumer Interface, including but not limited to, web browser, graphical user interface on web pages or applications, programmatic call to API endpoints, etc. In some embodiments, the buy request may be an automated buy request issued from a computing machine.

After receiving the buy request, the API infrastructure 620 may create and cryptographically sign a data packet, which may be referred to as Datagram1. Datagram1 may include, but is not limited to, one or more of the following data: timestamp for the buy request, a unique identifier for the Datagram1, a price of the digital asset requested in native currency of the decentralized ledger, price of the digital asset requested in the desired payment currency, addresses and/or other identifying information indicative of accounts managed by beneficiary publishers corresponding to the requested digital asset, and respective shares of funds to be paid out to all beneficiary publishers corresponding to the requested digital asset (these may be represented in various forms, such as percentage of price of the digital asset, or as amount for each beneficiary in any currency units, etc.).

The Datagram1 may be signed using the private key of the API infrastructure, 620, represented by Signature 1. To provide up-to-date price information of the digital asset in the payment currency the consumer desires to pay in, the API infrastructure 620 may make one or more calls to exchanges 640, to get the price in payment currency based on the exchange rate at that time. This may be regularly updated, and displayed or otherwise communicated to the consumer.

In an embodiment of the system, the price of the digital asset may be fixed in any currency (including but not limited to fiat currencies and cryptocurrencies). The API infrastructure 620 interacts with the exchanges 640 to provide current price of the digital asset in any currency required by the system, including payment currency, native currency, any crypto currency, any fiat currency, etc.

The signed Datagram1 may be sent to the consumer interface 610, after which the consumer interface 610 may make a transaction request, which may include, but is not limited to, evidence of making a native currency transaction (for the price shared in Datagram1) through a signed transaction or evidence of payment if the payment is made through any other currency (including but not limited to fiat currencies and cryptocurrencies, for the price shared in Datagram1). The consumer may create and sign Datagram2, which may include the Transaction Request (request to make a transaction) and Datagram1 (or information contained therein), and may send Datagram2 to the API infrastructure 620.

On receiving Datagram2, the API infrastructure 620 may choose to execute different actions based on the contents of Datagram2. FIG. 6 illustrates an example, in 650, of a possible decision-making scenario. If Datagram2 includes a transaction request in native currency, 650 may follow the "Yes, NC" flow, and send Datagram2 (which includes the transaction request) to the license contract, 630 to be executed.

However, if Datagram2 includes a transaction request that is not in the native currency (example in USD), 650 may follow the "No, NC" flow, and may additionally verify the payment evidence included in the Datagram2, verify the Datagram1 and that the amount paid is compliant with the required price in Datagram1, and then make a request to exchanges to the payment currency to a supported native currency. After exchanging the payment currency to the native currency, exchanges may directly send the Datagram2 with the native currency to the license contract, 630 to execute the transaction 675 in the native currency, or may do so through the API infrastructure 620 (which may forward the Datagram2 to the license contract). In one embodiment, an indication that the terms for purchasing or renting a digital asset have been met by a purchaser/renter/user of system 190 may be recorded in a blockchain transaction ledger before or when a copy of the digital asset is provided to the user.

In some embodiments, when the transaction is executed by the license contract, it may do so based on information in the Datagram2. It may also verify the signatures of Datagram1 and Datagram2. On executing the transaction, it may disburse funds to accounts or addresses managed by the beneficiary publishers in accordance with their appropriate share of funds from the transaction as provided in Datagrams 2. The beneficiary accounts or address receiving the funds from the successful execution of these transactions may be represented by Account 1, Account 2, through Account n for n beneficiary publishers.

In some embodiments, the funds after a transaction are accumulated in a single account 660, which then disburses funds to all Publishers, by maintaining a reliable log of the appropriate share of funds from the transaction for each beneficiary publish in 650. Such a reliable log may be created, for example, through the execution of the License Contract, on a decentralized transaction ledgers.

In some embodiments, the system may reduce or minimize the volatility of the native currency against any other currency in which the beneficiary publishers may want to receive or withdraw their funds, by exchanging their earned funds from native currency to any desired currency, through the exchanges. In this case, soon as a transaction is executed, the received funds in Account 1, Account 2, till Account n for n beneficiary publishers, may be exchanged and held in various different currencies, such as USD, GBP, JPY, XRP, etc. which includes but is not limited to fiat currencies and cryptocurrencies. As mentioned above, this may be sped up even more by using a reserve of native currency.

In some embodiments, the currencies may be exchanged to stablecoins in Account 1, Account 2, till Account n for n beneficiary publishers, to eliminate the volatility of the native currency, yet retain the ability to operate as a cryptocurrency. For example, to eliminate the volatility of the native currency against USD, the funds in Account 1, Account 2, till Account n for n beneficiary publishers, may be exchanged to USD backed stablecoins, such as Tether or USDC.

In some embodiments, the digital asset delivery process may be triggered upon successful execution of the transaction. The process may be initiated by the API infrastructure 620, based on an event, which may include but is not limited to a notification by the license contract, listening for a certain event/log/signal indicative of execution of the license contract, or tracking the decentralized ledger for logs/transactions. In an example, if a digital asset is a movie rented online by a consumer, the delivery process may involve giving the consumer (or an account associated with the consumer) access to watch the movie. The delivery process may also involve triggering additional functionality, such as, but not limited to, generating invoices or reports, shipping or mailing orders, generating follow-up transactions, or triggering calls to other programs, APIs or licenses contracts.

FIG. 6 illustrates exemplary methods and systems to execute a transaction and settle the revenue in real-time to interact with a digital asset, which may implement a variety of use cases, including but not limited to, buy or renting digital assets or collection of digital assets.

FIG. 7 illustrates another exemplary implementation of the system, in which consumers may pay for individual or collection of digital assets and settle the funds received from consumers at a finite time interval or on the occurrence of other events. This may implement various additional use cases, including but not limited to, for example enabling consumers to subscribe to a library of digital media content and settling revenue amongst publishers in accordance with the digital assets consumed or accessed by the consumer, at a finite frequency, for example at the end of every month. This exemplary implementation incorporates a number of smart contracts, discussed above, to implement the specific transaction processes described below with respect to FIG. 7.

It should be noted that FIG. 7 also provides an exemplary subscription based system for accessing digital assets in with asynchronous payments for publishers. For example, a user may pay a certain amount to access digital assets for a specific period of time, regardless of the amount of digital assets accessed by the user. Asynchronous payments refer to a publisher's share of the subscription payment being paid on a monthly or other time period basis (e.g., a few days, hours, minutes, or seconds) instead of on a user access/consumption basis. To implement a time-based payment clearance, for the described subscription model, the Event Trigger 770 triggers the payment clearance notification to the license contract based on a set time frequency (e.g., an end of every month). In this or other embodiments, prices of digital assets may be set by rights holders or by market forces. For example, a highly anticipated movie may be priced higher for the first week than less anticipated movies because of the anticipation associated with the movie. It is also possible that payment for a digital asset may be made prior to delivery of the digital asset by days, weeks, or months for a reduced price.

FIG. 7 includes the modules of FIG. 6—consumer interface 710 (same as 610), API infrastructure 720 (same as 620), license contract(s) 730 (same as 630), Exchange(s) 740 (same as 640), publisher(s) 750 (same as 650), and account(s) 760 (same as 660). Additionally, FIG. 7 contains one of more of the following modules:

Event trigger 770 notifies the license contract when it may initiate the settlement of received payments from entities such as consumers. The event trigger may be based on events, actions or occurrences internal or external to the system. Some non-limiting examples may include—date and time, weather, network load, number of transactions, total amount of payments received, any API calls, etc.

Collection account 780 is an account in which payments received from consumers is stored. It holds money temporarily, until the event trigger may alert the execution of the transaction through the license contract 775, to settle the received money and pay the appropriate publishers. Payments may be received in any monetary unit, referred to as payment currency, and may be stored in a different currency referred to as storage currency, which may be the same or different currencies, for any of the desired properties of the storage currency (non limiting examples may include stability, ease of digital operations, etc.). If the storage currency is not the same as the NC, the storage currency may be exchanged to the NC prior to the execution of the license contract transaction 775.

Ledger1, is the ledger that logs the received payments, making the logs auditable and usable by the license contract. It forms the basis of accounting for the balance available in the collection account 780.

Ledger2, is the ledger that logs the activities of consumers with the digital assets. Data in this ledger may be utilized to determine the distribution of the funds amongst the various publishers when the license contract transaction 775 is executed.

In some embodiments, after making a transaction request, which may include but is not limited to for example a consumer paying for a subscription to access a library of digital asses, the consumer may request access to a specific digital assets in 715. The request may be for the complete or for part of the digital asset (a non-limiting example could be streaming only part of a song to the consumer interface). In this case the API Infrastructure 720, creates and signs a data packet called Datagram3, with digital signature called Signature3. Datagram3 could include, but is not limited to, a unique identifier of the digital asset, an indicator of what portion or chunk of the digital asset is requested, an identifier of the consumer making the request, time and date of the request, and public key of the consumer. On receiving Datagram3 the consumer digitally signs it with Signature4 to create and send Datagram4 to the API Infrastructure 720. On successful verification of Datagram4, the access to the requested digital asset may be provided to the consumer through the consumer interface 710.

In some embodiments, the system in FIG. 7 enables subscription models for consumers of digital assets. For example, the system may be utilized to create subscription services for digital media content, including but not limited to movies, music, eBooks, news, etc. In another example, the system may be utilized to power subscription service for consumption of digital applications, such as games.

In some embodiments, the system in FIG. 7 may be utilized to power metered access to digital resources, that may be provided by one or more publishers, where the digital resources may include but is not limited to, computation, network usage, bandwidth, storage resources, etc. while automating accurate compensation to all publishers for contributing their resources to the system.

In some embodiments, the system in FIG. 7 provides high levels of flexibility and room for innovation in determining the revenue splitting model. For example, revenue attributed to a digital asset may be determined as the total times that asset has been assessed by the consumers as a percentage of the total time all (or a larger set of assets) have been assessed in the system by the consumers. In another example, revenue attributed to a digital asset may be determined as the total amount of time for which that asset has been assessed by the consumers as a percentage of the total amount of time for which all (or a larger set) of digital assets have been assessed in the system by the consumers. In yet another example, revenue attributed to a digital asset may be determined as its utility to its consumers, i.e. for each individual consumer the revenue share for a digital asset is the time that consumer spent of a particular asset as a percentage of the time that same consumer spent on all (or a larger set) of digital assets.

In some embodiments, the system in FIG. 7 provides high levels of flexibility and room for innovation in determining the revenue attribution to publishers of digital assets, when part or all of the revenue generated by digital assets through applications and/or consumer interface(s) 710 is through the featuring or engagement with advertised or otherwise sponsored content. The system collects, and logs revenue from the featuring or engagement of advertised or sponsored content in the consumer interface(s) 710 through Ledger1 and Ledger2, and is able to implement a variety of methods of attribute revenue to publisher, in a similar or different manner as attributing revenue through consumers' payments.

Thus, even though consumers, the system, and publishers may use different currencies, transactions may be executed quickly and reliably. In some embodiments, the system may not need to use banks as intermediaries. Such multi-currency transactions for digital assets, wherein each transaction may involve multiple consumers, multiple digital assets and multiple beneficiaries across multiple geographies globally, may be conducted securely in a short time (e.g., few seconds) and may be more cost-efficient than various commonly used alternatives of today.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A system, comprising:
   a first computing device in communication with a user device and a distributed network of computing nodes, the first computing device including one or more processors and a computer-readable storage medium storing instructions, which when executed by the one or more processors cause the one or more processors to perform the steps of:
   receiving one or more digital assets from a publisher;
   receiving one or more digital asset access terms specified by the publisher to access the one or more digital assets;
   assigning a unique digital identifier to one of the one or more digital assets;
   receiving, from the user device, a digital asset access request comprising the unique digital identifier;
   identifying, based on the received unique digital identifier, one or more digital asset access terms specified by the publisher of the one or more digital asset;
   sending, to the user device, the one or more digital asset access terms specified by the publisher of the digital asset;
   receiving, from the user device, an indication that the user accepts the one or more digital asset access terms specified by the publisher of the digital asset;
   creating a first cryptographically signed data packet comprising the unique digital identifier, a price of the digital asset and one or more beneficiaries of the payments, the first cryptographically signed data packet signed with a private key of the first computing device;
   sending, to the user device, the first cryptographically signed data packet;
   receiving, from the user device, a second cryptographically signed data packet, the second cryptographically signed data packet comprising the first cryptographically signed data packet and a transaction request comprising evidence of payment of the price of the digital asset, the second cryptographically signed data packet cryptographically signed by the user private key;
   submitting the second cryptographically signed data packet to a license contract in a decentralized transaction ledger, and
   providing, in response to successful execution of a transaction distributing payments to the one or more beneficiaries by the distributed network of computing nodes, the digital asset to a device associated with the user along with access to the digital asset based on the one or more digital asset access terms specified by the publisher of the digital asset;
   the distributed network of computing nodes including a plurality of processors and a plurality of computer-readable storage media storing instructions, which when executed by the computing nodes cause the computing nodes to implement the decentralized transaction ledger and perform the steps of:
   receiving the second cryptographically signed data packet by the license contract;
   verifying the signatures of the first and second cryptographically signed data packets; and
   in response to successfully verifying the signatures, executing, by the license contract on the decentralized transaction ledger, the transaction distributing payments to the one or more beneficiaries based on the contents of the second cryptographically signed data packet.

2. The system of claim 1, wherein the one or more digital asset access terms are stored in the computer-readable storage medium and specified in smart contracts.

3. The system of claim 1, the computer-readable storage medium further storing instructions, which when executed by the one or more processors cause the one or more processors to perform the step of receiving, from the publisher a specified payment acceptance currency.

4. The system of claim 3, wherein the specified payment acceptance currency is a fiat currency.

5. The system of claim 3, wherein the specified payment acceptance currency is a cryptocurrency.

6. The system of claim 1, the computer-readable storage medium further storing instructions, which when executed by the one or more processors cause the one or more processors to perform the step of receiving a digital asset payment in a first currency.

7. The system of claim 6, the computer-readable storage medium further storing instructions, which when executed by the one or more processors cause the one or more processors to perform the step of exchanging the first currency into a second currency.

8. The system of claim 7, wherein the first currency is a fiat currency and the second currency is a cryptocurrency.

9. The system of claim 6, the plurality of computer-readable storage medium further storing instructions, which when executed by the computing nodes cause the computing nodes to perform the step of issuing, by the one or more processors, a digital asset payment to a publisher in real-time when the digital asset payment is received.

10. A method, comprising:
    implementing, by a distributed network of computing nodes, a decentralized transaction ledger;

receiving, by one or more processors of a first computing device, one or more digital assets from a publisher;

receiving, by the one or more processors, one or more digital asset access terms specified by the publisher to access the one or more digital assets;

assigning, by the one or more processors, a unique digital identifier to one of the one or more digital assets;

receiving from a user device, by the one or more processors, a digital asset access request comprising the unique digital identifier;

identifying, by the one or more processors based on the received unique digital identifier, one or more digital asset access terms specified by the publisher of the one or more digital asset;

sending, by the one or more processors to the user device, the one or more digital asset access terms specified by the publisher of the digital asset;

receiving, by the one or more processors from the user device, an indication that the user accepts the one or more digital asset access terms specified by the publisher of the digital asset;

creating, by the one or more processors, a first cryptographically signed data packet comprising the unique digital identifier, a price of the digital asset and one or more beneficiaries of the payments, the first cryptographically signed data packet signed with a private key of the first computing device;

sending, by the one or more processors to the user device, the first cryptographically signed data packet;

receiving, by the one or more processors from the user device, a second cryptographically signed data packet, the second cryptographically signed data packet comprising the first cryptographically signed data packet and a transaction request comprising evidence of payment of the price of the digital asset, the second cryptographically signed data packet cryptographically signed by the user private key;

submitting, by the one or more processors, the second cryptographically signed data packet to a license contract in the decentralized transaction ledger, receiving, by the license contract on the decentralized ledger, the second cryptographically signed data packet;

verifying, by the license contract on the decentralized ledger, the signatures of the first and second cryptographically signed data packets; and in response to successfully verifying the signatures, executing, by the license contract on the decentralized transaction ledger, a transaction distributing payments to the one or more beneficiaries based on the contents of the second cryptographically signed data packet; and providing, by the one or more processors, in response to successful execution of the transaction distributing payments to the one or more beneficiaries on the decentralized transaction ledger, the digital asset to a device associated with the user along with access the digital asset based on the one or more digital asset access terms specified by the publisher of the digital asset.

11. The method of claim 10, further comprising:
storing, by the one or more processors, the one or more digital asset access terms in a memory device as smart contracts.

12. The method of claim 11, further comprising:
nesting, by the one or more processors, the smart contracts.

13. The method of claim 11, further comprising:
receiving, by one or more processors from the publisher a specified payment acceptance currency.

14. The method of claim 13, wherein the specified payment acceptance currency is one of a fiat currency or a cryptocurrency.

15. The method of claim 10, further comprising:
receiving, by the one or more processors, a digital asset payment in a first currency.

16. The method of claim 15, further comprising:
issuing, by the license contract on the decentralized transaction ledger, a payment to the publisher in real-time of receiving the digital asset payment.

17. The method of claim 10, wherein the decentralized transaction ledger is one of a publicly accessible decentralized transaction ledger and a privately accessible transaction ledger.

18. The method of claim 10, wherein access to the digital asset is subscription based.

19. The method of claim 18, wherein payments to the publisher of the digital asset are asynchronous.

20. The method of claim 10, further comprising:
accessing, by the one or more processors, an account of a user;
transferring, by the one or more processors, an amount of currency to another computing device;
exchanging, by the one or more processors the currency into another currency; and
depositing, by the one or more processors, the another currency into a publisher account.

\* \* \* \* \*